US011831411B2

(12) United States Patent
Griswold (10) Patent No.: US 11,831,411 B2
(45) Date of Patent: Nov. 28, 2023

(54) CUT-THROUGH LATENCY AND NETWORK FAULT DIAGNOSIS WITH LIMITED ERROR PROPAGATION

(71) Applicant: Avago Technologies International Sales Pte. Limited., Singapore (SG)

(72) Inventor: Mark David Griswold, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/704,931

(22) Filed: Mar. 25, 2022

(65) Prior Publication Data

US 2023/0308376 A1     Sep. 28, 2023

(51) Int. Cl.
  *H04L 43/10*      (2022.01)
  *H04L 43/022*     (2022.01)
  *H04L 43/04*      (2022.01)
  *H04L 49/25*      (2022.01)

(52) U.S. Cl.
  CPC ............ *H04L 43/10* (2013.01); *H04L 43/022* (2013.01); *H04L 43/04* (2013.01); *H04L 49/252* (2013.01)

(58) Field of Classification Search
  None
  See application file for complete search history.

(56) References Cited

U.S. PATENT DOCUMENTS

| 5,491,687 | A | * | 2/1996 | Christensen | .......... H04L 49/351 370/403 |
| 6,094,434 | A | * | 7/2000 | Kotzur | .................. H04L 49/351 370/429 |
| 6,144,668 | A | * | 11/2000 | Bass | ........................ H04L 45/00 370/428 |
| 6,907,040 | B2 | | 6/2005 | Matsuzawa | |
| 9,699,118 | B2 | | 7/2017 | Griswold et al. | |
| 10,129,184 | B1 | | 11/2018 | Achola et al. | |
| 10,397,143 | B1 | * | 8/2019 | Plenderleith | .......... H04L 49/257 |
| 10,764,214 | B1 | * | 9/2020 | Plenderleith | .......... H04L 41/064 |
| 2014/0286352 | A1 | * | 9/2014 | Turgeman | ............... H04L 45/00 370/428 |
| 2015/0089047 | A1 | * | 3/2015 | Matthews | ............. H04L 1/0082 709/224 |

FOREIGN PATENT DOCUMENTS

| WO | WO-99-52299 A2 | 10/1999 |
| WO | 2019025835 A1 | 2/2019 |

OTHER PUBLICATIONS

Extended European Search Report for EP 23163026.0 dated Jul. 6, 2023, 10 pages.

* cited by examiner

*Primary Examiner* — John A Follansbee
*Assistant Examiner* — Kamal M Hossain
(74) *Attorney, Agent, or Firm* — Quarles & Brady LLP (57) ABSTRACT

A switch may operate in a cut-through mode and a store-and-forward mode. While in a default cut-through mode, the switch continuously monitors ports for certain health metrics. If those health metrics fall below a threshold, the switch changes to operate in a store-and-forward mode, either for a predetermined period of time or until the health metrics rise above a threshold, at which point the switch can resume cut-through mode operations. If health metrics fall below an even lower threshold, or remain below threshold for a predefined period of time, the switch can automatically alert a remote system or software process.

17 Claims, 13 Drawing Sheets

CUT-THROUGH LATENCY AND NETWORK FAULT DIAGNOSIS WITH LIMITED ERROR PROPAGATION

FIELD OF THE INVENTION

Embodiments of the inventive concepts disclosed herein are directed generally toward network switches, and more particularly toward network switches that enter and leave a cut-through mode based on port specific health metrics.

BACKGROUND

Existing network switches, such as those employed in a datacenter, cannot meet the dual objectives of low latency and fault isolation. Cut-through (CT) switching has low latency but poor fault isolation because data packets may be passed through before the entire data packet is received and so potentially before a fault can be identified. Store-and-forward (SAF) switching is fault tolerant because it requires the entire data packet to be received before it is forwarded, but it introduces significant latency for data packets that could have otherwise been passed through safely. It would be advantageous to have a switch and switching methodology that enabled both low latency and fault isolation.

SUMMARY

In one aspect, embodiments of the inventive concepts disclosed herein are directed to a switch having a CT mode and an SAF mode. While in a default CT mode, the switch continuously monitors ports for certain health metrics. If those health metrics fall below a threshold, the switch changes to operate in an SAF mode, either for a predetermined period of time or until the health metrics rise above a healthy threshold, at which point the switch can resume CT mode operations.

In a further aspect, if health metrics fall below an even lower threshold, or remain below the threshold for a predefined period of time, the switch can automatically alert a remote system or software process.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement.

Components may be in data communication with intervening components that are not illustrated or described. It may be appreciated that "data communication" refers to both direct and indirect data communication (e.g., there may be intervening components).

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a network device having a CT mode and an SAF mode. While in a default CT mode, the network device continuously monitors ports for certain health metrics. If those health metrics fall below a threshold, the network device changes to operate in an SAF mode, either for a predetermined period of time or until the health metrics rise above a threshold, at which point the network device can resume CT mode operations. If health metrics fall below an even lower threshold, or remain below threshold for a predefined period of time, the network device can automatically alert a remote system or software process.

Figure 1A:
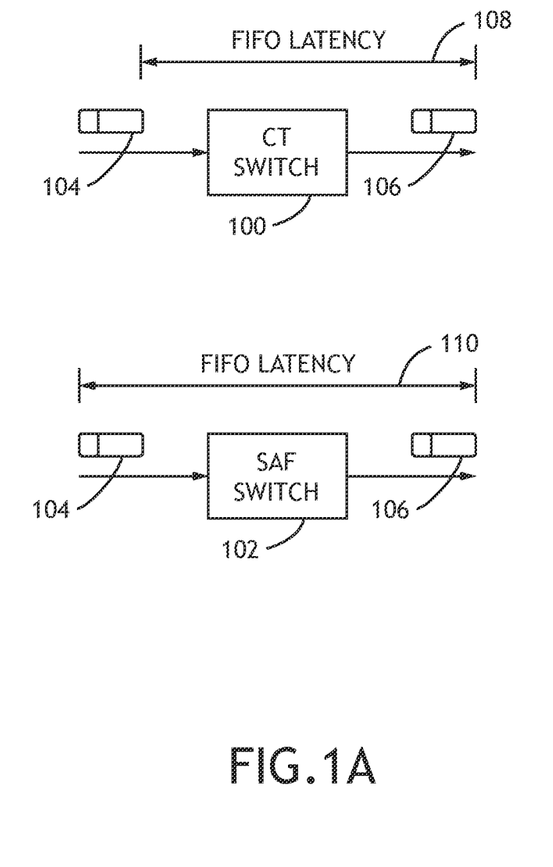
FIG. 1A shows a block representation of data packet propagation through switches in different modes of operation.
Figure 1B:
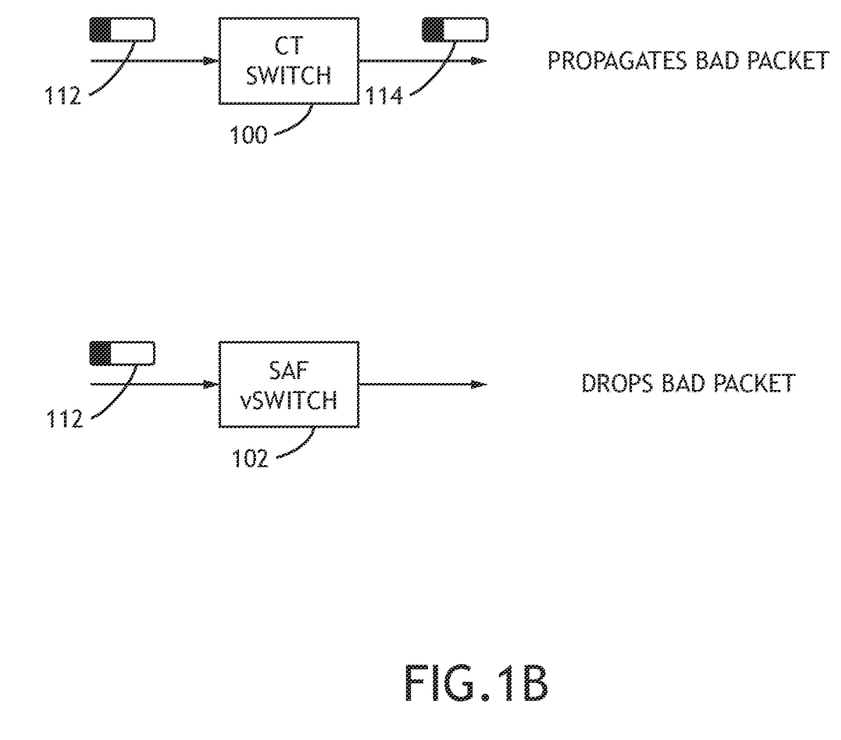
FIG. 1B shows a block representation of data packet propagation through switches in different modes of operation.

Referring to FIGS. 1A-1B, block representations of data packet propagation through switches in different modes of operation are shown. A CT mode switch 100 receives an input data packet 104 and begins outputting an output data packet 106 as early as possible, before receiving the entire input data packet 104. By contrast, an SAF mode switch 102 receives the entire input data packet 104 and verifies its integrity before outputting the output data packet 106. The CT mode switch 100 produces less latency 108, 110 between receiving the input data packet 104 and outputting the output data packet 106 as compared to the SAF mode switch 102.

While the input data packets 104 are fault free, CT mode switches 100 propagate data packets 104, 106 faster than SAF mode switches 102. However, faulty data packets pass through CT mode switches 100 before faults are identified. For example, a faulty input data packet 112 (e.g., a data packet containing an error identified via a cyclic redundancy check, error correction code, cryptographic hash function, or the like) may be passed though the CT mode switch 100 as a faulty output data packet 114 because error checking bits only appear at the end of the data packet 112, 114. While both CT mode switches 100 and SAF mode switches 102 would identify the faulty input data packet 112, only the SAF mode switch 102 would halt propagation.

CT mode switches 100 have lower network latency by reducing switch delay; the benefit is multiplied by the number of hops, as each hop in an SAF mode switch 102 would add an incremental switch delay. However, when faulty input data packets 112 exist, a network of CT mode switches 100 may propagate the faulty input data packets 112 without restriction.

Figure 2A:
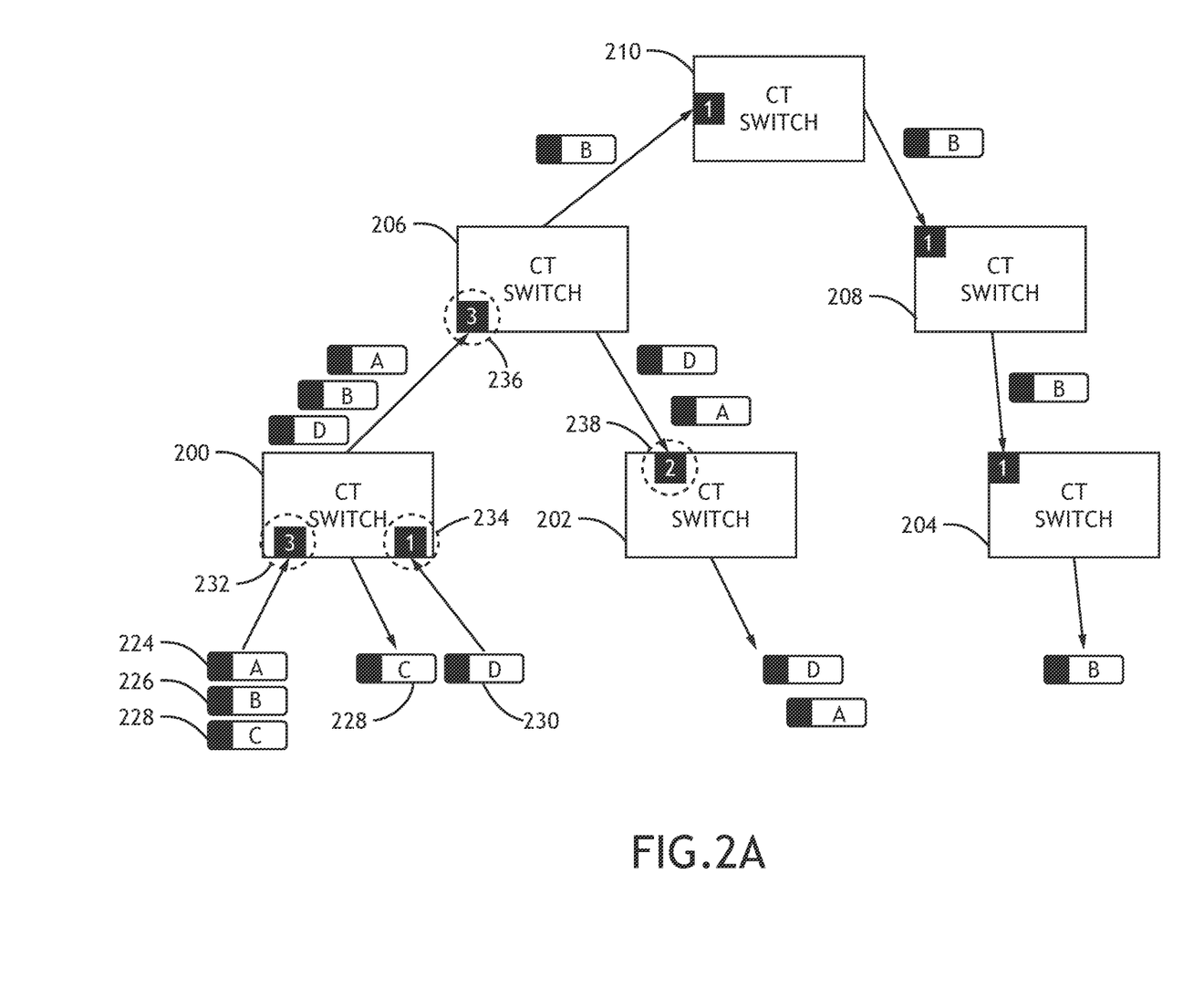
FIG. 2A shows a block representation of bad data packet propagation through a network of switches in a CT mode.
Figure 2B:
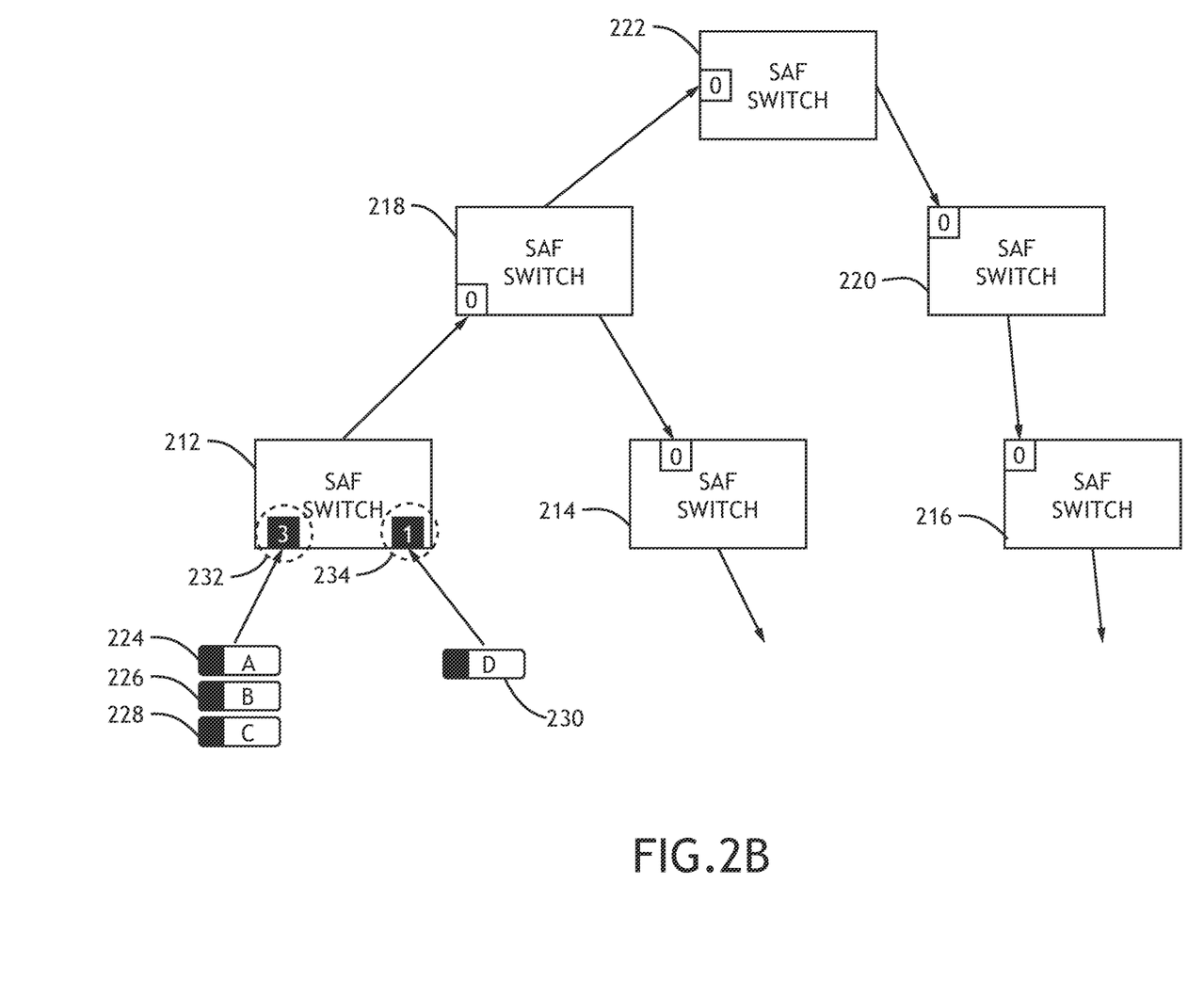
FIG. 2B shows a block representation of bad data packet propagation through a network of switches in an SAF mode.

Referring to FIGS. 2A-2B, block representations of bad data packet propagation through a network of switches in different modes are shown. In a network of CT mode switches 200, 202, 204, 206, 208, 210, faulty data packets 224, 226, 228, 230 may be propagated to any other CT mode switch 200, 202, 204, 206, 208, 210, and even to an end user/client. For example, a first CT mode switch 200 may receive a first faulty data packet 224 and a second faulty data packet 226 via a first port 232. The first faulty data packet 224 and second faulty data packet 226 may be quickly propagated to downstream CT mode switches 202, 204, 206, 208, 210. At each hop (propagation from one switch 200, 202, 204, 206, 208, 210 to the next), the switch 200, 202, 204, 206, 208, 210 may determine that a faulty data packet 224, 226, 228, 230 is faulty based on some mode of error checking, and tag the corresponding port 232, 234, 236, 238 as supplying the faulty data packet 224, 226, 228, 230, but the faulty data packets 224, 226, 228, 230 would continue to be propagated. It should be appreciated that "port", within the context of the present disclosure, refers to a defined portion of a devices' address space where data can be sent and received. Some instances of "port" or "data port" described herein may refer to a "receive port" or "relay port" or the like; in those instances, it may be appreciated that such distinctions are relative in nature, and are based on the instantaneous directionality of data flow.

By comparison, in a network of SAF mode switches 212, 214, 216, 218, 220, 222, faulty data packets 224, 226, 228, 230 may still be received at ports 232, 234 in a first SAF mode switch 212, but the first SAF mode switch 212 would verify those faulty data packets 224, 226, 228, 230 before retransmitting them, and the faulty data packets 224, 226, 228, 230 would be isolated at the first SAF mode switch 212. Further analysis may identify a faulty link or upstream device providing the faulty data packets 224, 226, 228, 230, simplifying network diagnosis and management. However, while data packets are valid, each SAF mode switches 212, 214, 216, 218, 220, 222 imposes additional latency per data packet.

Figure 3:
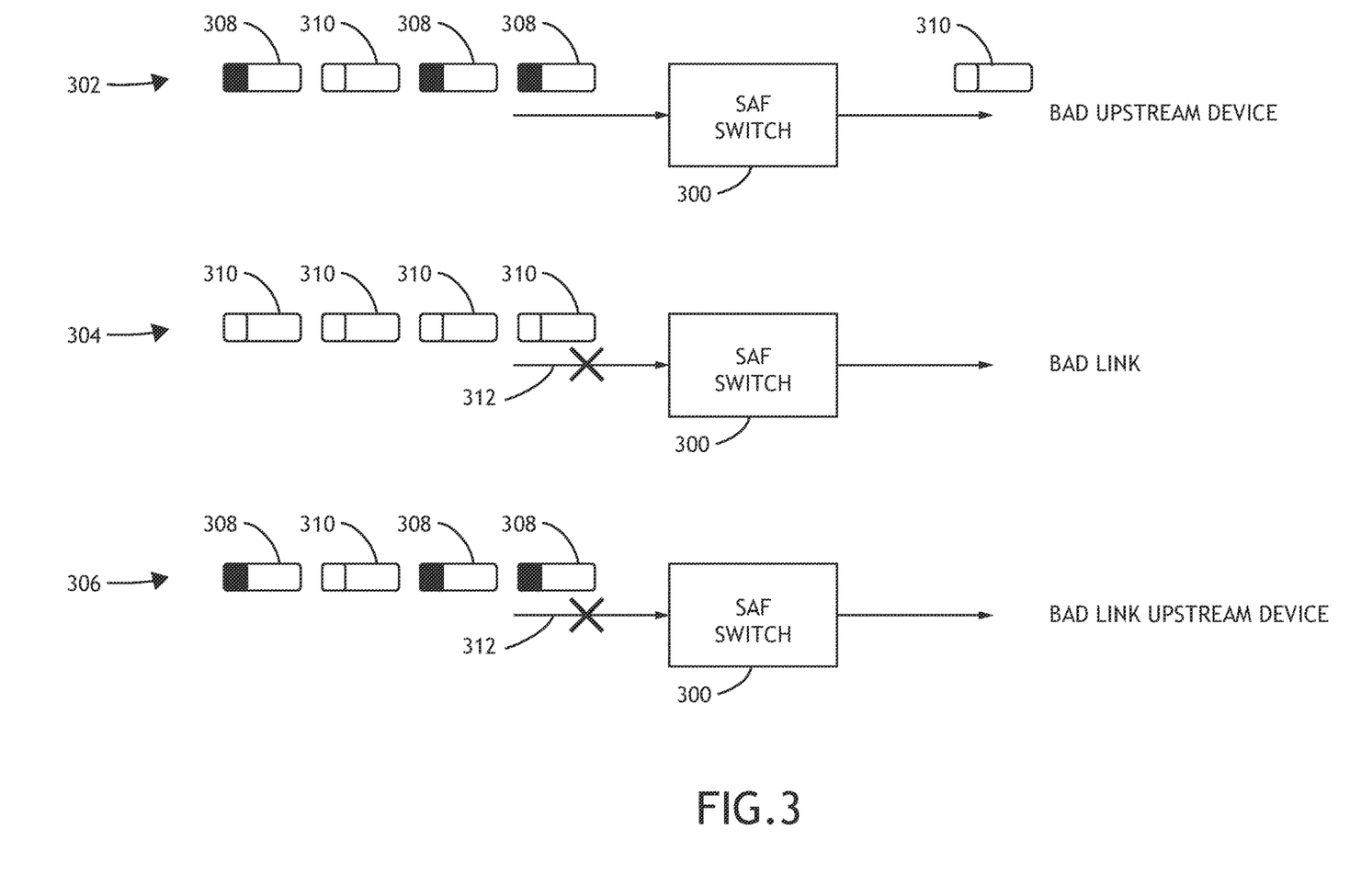
FIG. 3 shows block representations of data packet propagation through switches in various fault states.

Referring to FIG. 3, block representations of data packet propagation through switches in various fault states is shown. An SAF mode switch 300 may experience several types of data packet faults. In a first scenario 302, a faulty upstream device produces some faulty data packets 308 and some valid data packets 310. The SAF mode switch would successfully propagate the valid data packets 310 and isolate the faulty data packets 308.

In a second scenario 304, a working upstream device produces valid data packets 310 but is connected to the SAF mode switch 300 via a faulty link 312 to a specific port. The faulty link 312 functionally causes all of the valid data packets 310 to appear faulty, and the SAF mode switch 300 would isolate all of those valid data packets 310.

In a third scenario 306, a faulty upstream device produces some faulty data packets 308 and some valid data packets 310, but the upstream device is connected to the SAF mode switch 300 via a faulty link 312. The faulty link 312 functionally causes all of the valid data packets 310 to appear faulty, and the SAF mode switch 300 would isolate both the faulty data packets 308 and the valid data packets 312.

It may be appreciated that successfully isolating errors to a particular source port is not a complete diagnosis. Network management must still determine if the fault is in the upstream device, link, or both. The SAF mode switch 300 may record fault statistics for future planning and determining remedial actions.

Figure 4A:
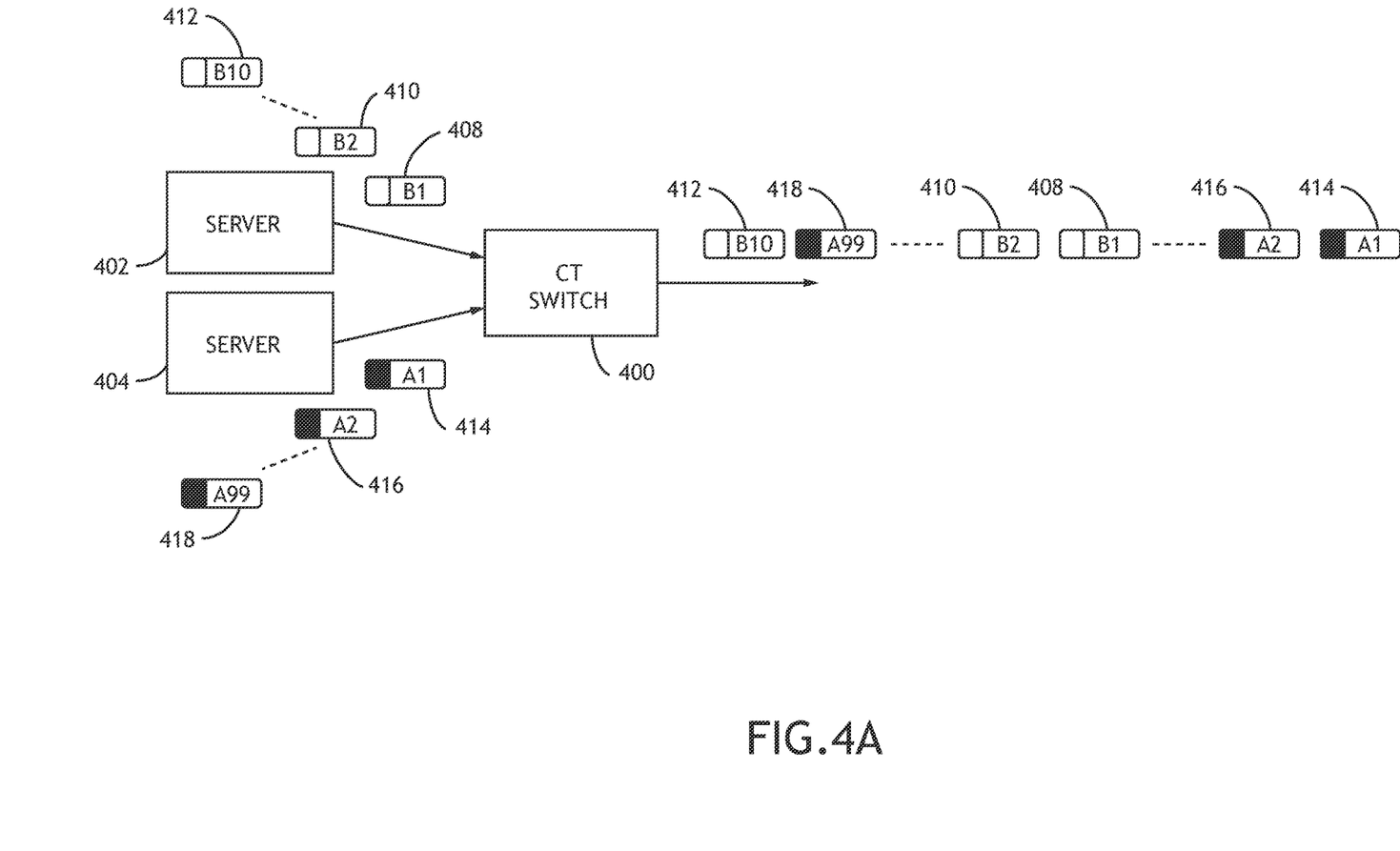
FIG. 4A shows a block representation of data packet propagation through a CT switch.
Figure 4B:
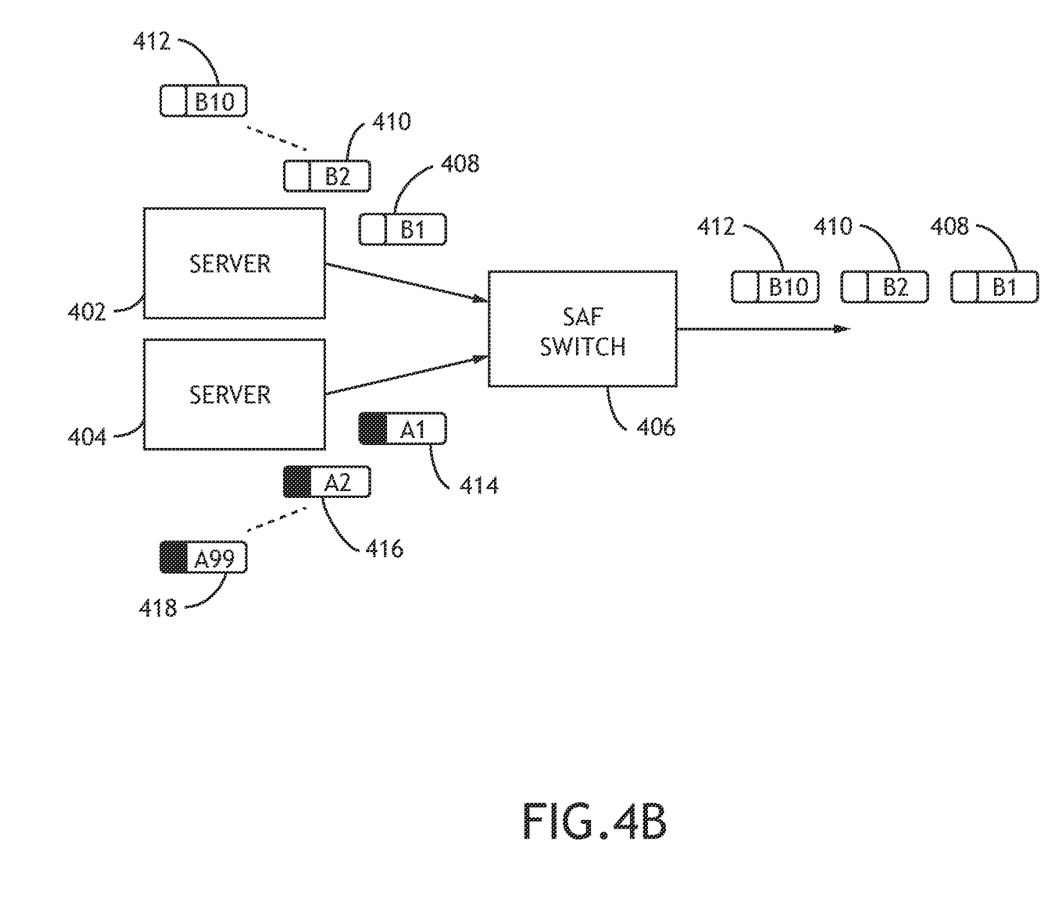
FIG. 4B shows a block representation of data packet propagation through an SAF switch.

Referring to FIGS. 4A-4B, block representations of data packet propagation through switches 400, 406 in various modes are shown. With a CT mode switch 400 connected to upstream servers 402, 404 for downstream data propagation, a first server 402 may produce valid data packets 408, 410, 412 while a second server 404 may produce faulty data packets 414, 416, 418 from the perspective of the CT mode switch 400 (either due to a faulty data source or a faulty link). While CT mode switches generally produce lower latency as compared to SAF mode switches, in situations where the CT mode switch 400 passes through faulty data packets 414, 416, 418, the faulty data packets 414, 416, 418 may be unusable and therefore produce effectively greater latency for valid data packets 408, 410, 412 propagated behind the faulty data packets 414, 416, 418. By comparison, an SAF mode switch 406 in the same scenario would produce lower network level latency because bandwidth within the network is not consumed by faulty data packets 414, 416, 418. Dropping faulty data packets 414, 416, 418 avoids latency caused by valid data packets 408, 410, 412 waiting behind the faulty data packets 414, 416, 418. That consideration is especially important if the second upstream server 404 sends an abnormally high load, compared with normal network traffic.

The failure rate and failure modes of servers 402, 404 and endpoints may be significantly worse than for upstream switches due to their higher total complexity. Switching between a CT mode and SAF mode for a single hop has a negligible impact on latency but a significant impact on a system's ability to diagnose between network errors and server errors.

Figure 5:
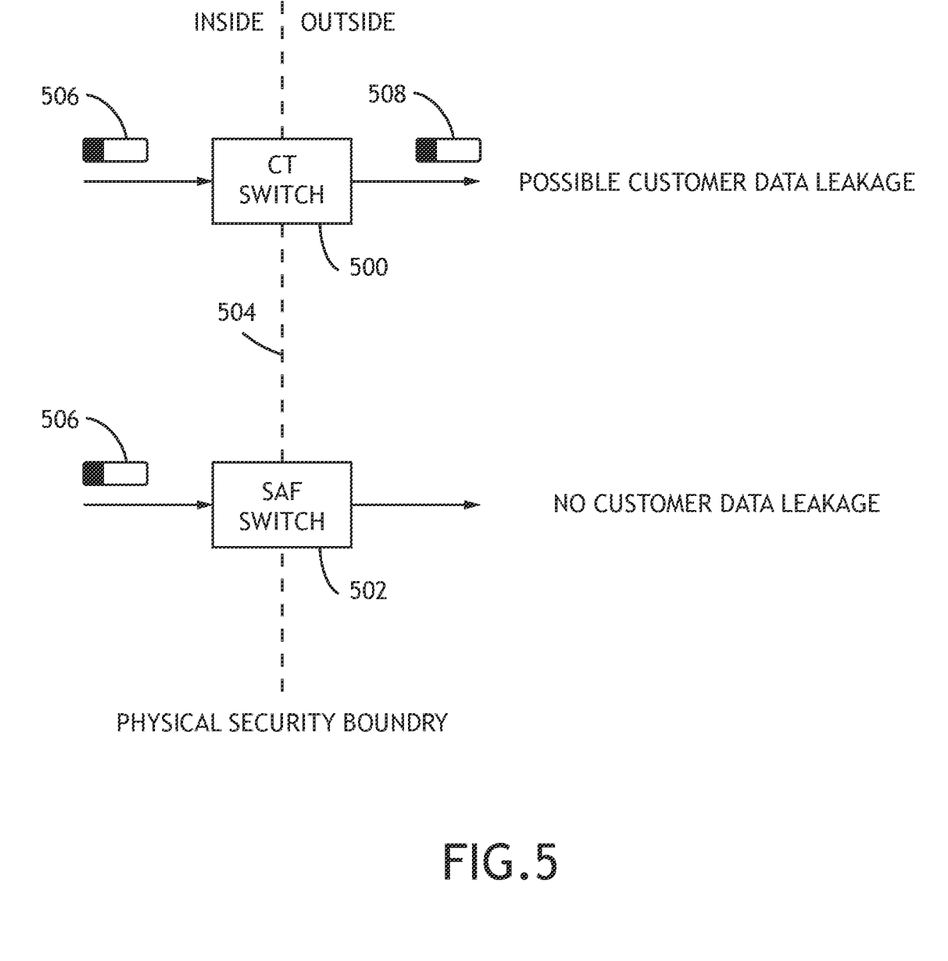
FIG. 5 shows a block representation of data packet propagation through switches with a security boundary.

Referring to FIG. 5, a block representation data packet propagation through switches 500, 502 with security boundary 504 is shown. In one specific scenario, a faulty header in a faulty data packet 506 may lead to incorrect forwarding. In such scenario, a CT mode switch 500 may erroneously route an internal faulty data packet 506 as an external faulty data packet 508 based on the faulty header. However, the packet payload of the external faulty data packet 508 may still include sensitive data forwarded outside the physical barrier.

Figure 6:
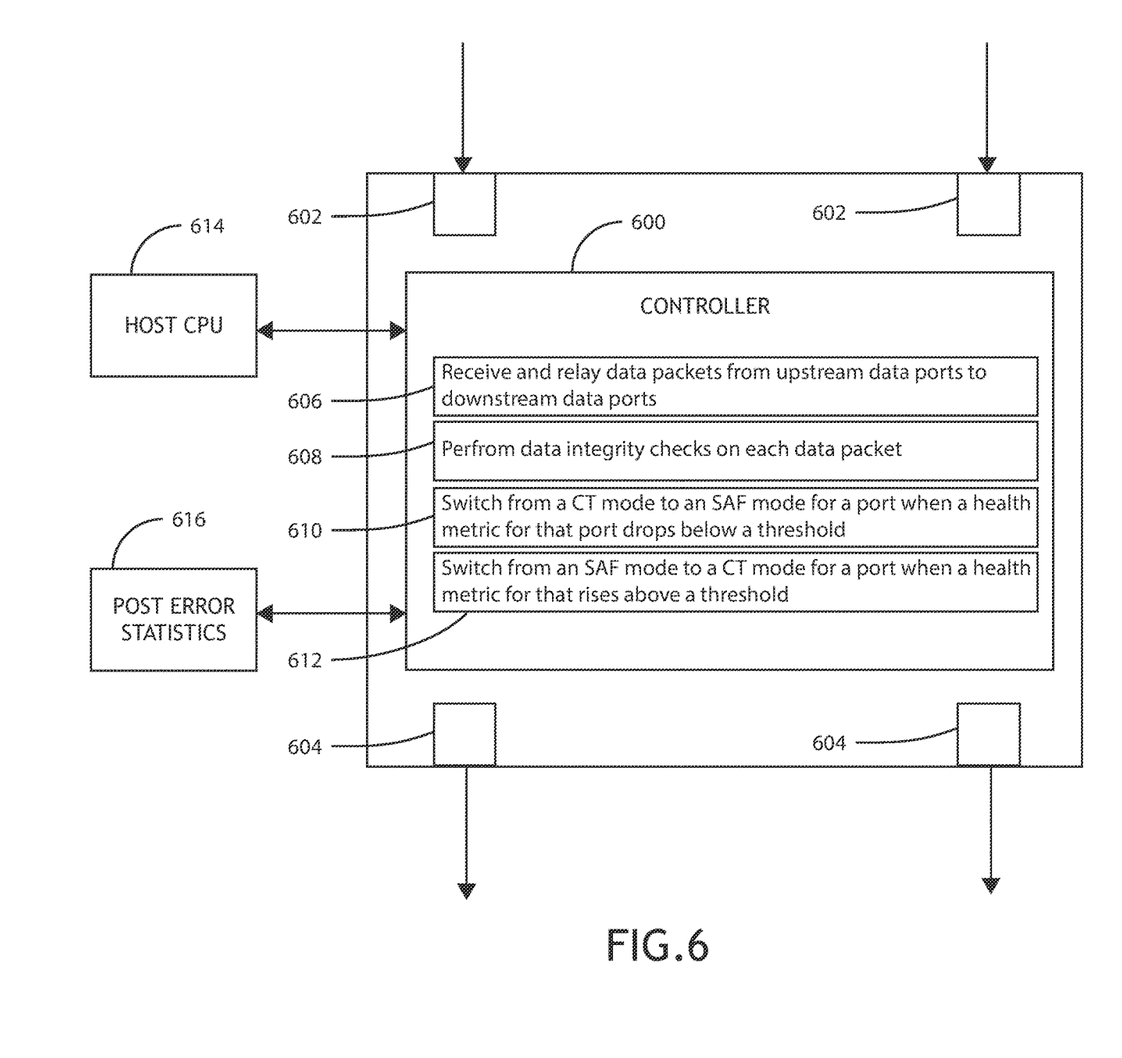
FIG. 6 shows a block diagram of a switch according to an exemplary embodiment of the present disclosure.

Referring to FIG. 6, a block diagram of a switch according to an exemplary embodiment of the present disclosure is shown. The switch includes a controller 600 or processor configured operate the switch in a CT mode and in an SAF mode. It may be appreciated that "processor" may refer to a specialty processor hard wired for the described purposes, a general-purpose programmable central processing unit (CPU), a field programmable gate array, and other such data processing technology. Where the processor comprises a device configurable by software or firmware, such software or firmware may be embodied in a non-transitory memory; such memory may employ PROM, EPROM, EEPROM, flash memory, dynamic random-access memory, or the like. The controller 600 is configured to perform certain process steps 606, 608, 610, 612 as more fully described herein.

By default, the controller 600 maintains the switch in a CT mode and continuously monitors the health of each connected data port. While in the CT mode, the controller 600 is electronically configured to receive and forward 606 data packets from an upstream receive port 602 to a downstream relay port 604. The controller 600 is configured to simultaneously perform 608 data integrity checks on each data packet or a sample of data packets to quantify port link health in the form of a port health metric. The port health metric refers to some quantification of known data integrity errors associated with the corresponding receive port 602. When a port health metric drops below a predefined unhealthy threshold, the controller 600 is configured to change 610 to the SAF mode. The predefined unhealthy threshold may be defined by a number of errors over time associated with a receiving port 602, a ratio of faulty packets associated with a receiving port 602, a shift in a histogram as described herein, or the like. While in the SAF mode, the controller 600 performs and completes data integrity checks (including any error correction, cyclic redundancy checks, cryptographic hash functions, and the like) on each data packet before relaying the data packet to the corresponding downstream device. Where data correction is not possible, for example when the number of faulty bits is too great, the faulty data packet is dropped. Dropping bad packets simplifies network diagnosis and management by isolating faulty components, avoids latency increases caused by waiting behind bad packets, protects the network from faulty servers and other endpoints, and avoids data leakage from physical security boundaries. In at least one embodiment, the controller 600 is configured to change 612 back to the CT mode after a predefined period of time, or after the port health metric for that port 602 rises above a defined healthy threshold. The predefined healthy threshold may be defined by a number of errors over time associated with a receiving port 602, a ratio of faulty packets associated with a receiving port 602, a shift in a histogram, or the like.

In at least one embodiment, the controller 600 relays data packets in the SAF mode for upstream ports 602 with a port health metric below the predefined unhealthy threshold while continuing to operate the remaining upstream ports 602 in the CT mode.

In at least one embodiment, a port health metric is measured by monitoring forward error correction (FEC) statistics via a flight data recorder. Likewise, upstream device health may be measured by monitoring Ethernet MIB counters. Furthermore, cyclic redundancy checks (CRC) may be used to identify faulty data packets and a degree of fault (the number of faulty bits). A port health metric may be measured by the number of faults per port 602 over a period of time, with the number of faults being a rolling counter. Alternatively, or in addition, faults may be weighted with more recent faults having a more significant impact on the a port health metric than prior faults. Weighted fault measurements may identify trends in port health to allow the controller 600 to prospectively switch 610 to the SAF mode in advance of a heavy fault load.

In at least one embodiment, the controller 600 maintains a histogram or histogram like table of faults for each data port 602. In such embodiments, a port health metric may be measured, at least in part, as a shift in the histogram over time. Where the controller 600 registers a shift in the histogram over time, the controller 600 may recognize a trend toward an increasing number of faulty bits and switch 610 to the SAF mode before the controller 600 is configured to relay 606 any unrecoverable data packets. In at least one embodiment, the controller 600 is configured to change 610 within 50 μ seconds for 100 G ports 602.

When the controller 600 has changed 610 to the SAF mode, CRC error counters will only continue to increase for source ports 602 in poor health. The step of changing 610 to the SAF mode limits the number of faulty data packets that are propagated to relay ports 604.

Operating temporarily in an SAF mode allows the controller 600 to communicate with a management plane monitor host processor 614 and alert a network health management system about the faulty port 602. It may be appreciated that the management plane monitor may include any system for receiving and recording network events that correspond to errors and the like that may require some user intervention. If the controller 600 determines that the port 602 health has dropped below a lower threshold as defined by a number of errors over time, a ratio of faulty packets, a shift in a histogram, or the like, the controller may automatically notify the host processor 614 and other software to share error statistics 616 that may be useful for diagnosing the fault. Embodiments of the present disclosure allow a fast alert to the management plane monitor and error statistic 616 gathering to guide the control plane and equipment replacement decisions. In at least one embodiment, the switch may include more than one controller 600 to accelerate detection.

While embodiments described herein specifically refer to a "switch" it should be appreciated embodiments may be applicable to any computer apparatus that receives and distributes data packets in a network, and that can operate in a CT mode or an SAF mode. In the context of the present disclosure, "computer apparatus" refers to any device with one or more processors, either specifically configured to perform the functions described here or electronically configurable via software or firmware.

Figure 7:
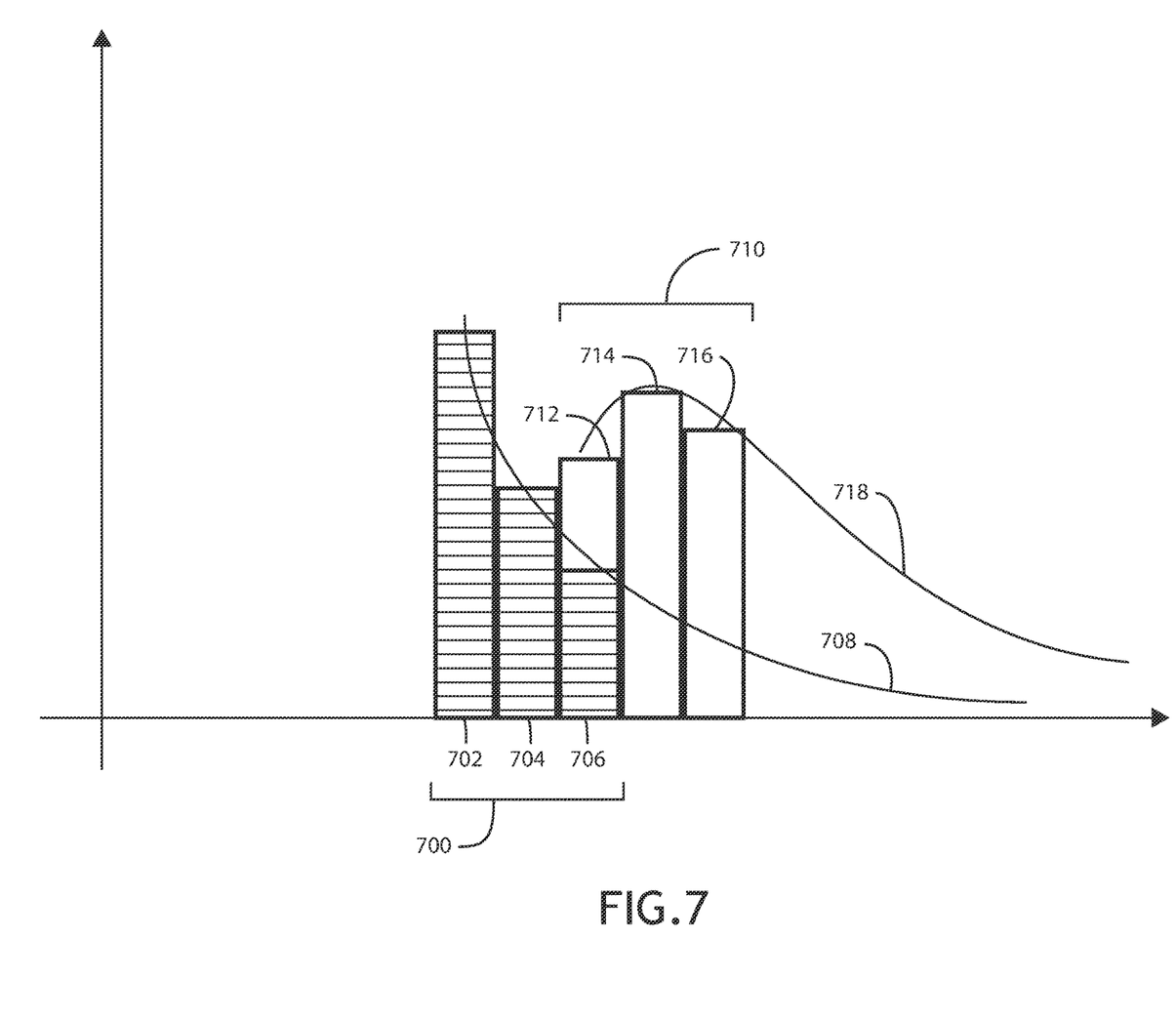
FIG. 7 shows a histogram of identified faults useful in exemplary embodiments of the present disclosure.

Referring to FIG. 7, a histogram of identified faults useful in exemplary embodiments of the present disclosure is shown. In at least one embodiment, a switch processor may track faults over time. For example, for a first period of time 700, the processor may identify data packets with one fault 702, two faults 704, and three faults 706. The distribution of the number of faults 702, 704, 706 in faulty data packets during the first time period 700 may be represented as a first period distribution curve 708. At a later, second period of time 710, the processor may identify data packets with one fault 712, two faults 714, and three faults 716. The distribution of the number of faults 712, 714, 716 in faulty data packets during the second time period 710 may be represented as a second distribution curve 718.

A shift from the first period distribution curve 708 to the second period distribution curve 718, as represented via the underlying data, may indicate a port link health degradation manifested through a shift in the histogram for the FEC correction. For example, a shift from predominantly one fault 702 data packets to increasing numbers of three fault 716 data packets may indicate degrading data link quality. Where the shift toward data packets with increasing faults can be identified in real time, the processor may switch to an SAF mode before the port starts producing predominantly unrecoverable faulty data packets, thereby preventing unrecoverable data packets from being forwarded downstream. A health metric based on a shift in the histogram may identify a trend in faults before a substantial number of errors are produced, reducing the overall impact on system performance.

In at least one embodiment, the numbers of faults 702, 704, 706, 712, 714, 716 may represent corrected data symbols. Where data packets comprise code words constructed of data, symbols, and parity, or check symbols, the receiver may perform FEC and correct the data symbols if there is a corrupted link. By tracking the number of symbols that need to be corrected (as represented by the numbers of faults 702, 704, 706, 712, 714, 716), and the shift in the number of required symbol corrections over time, a faulty or degrading link may be identified before symbols become uncorrectable by FEC.

Figure 8:
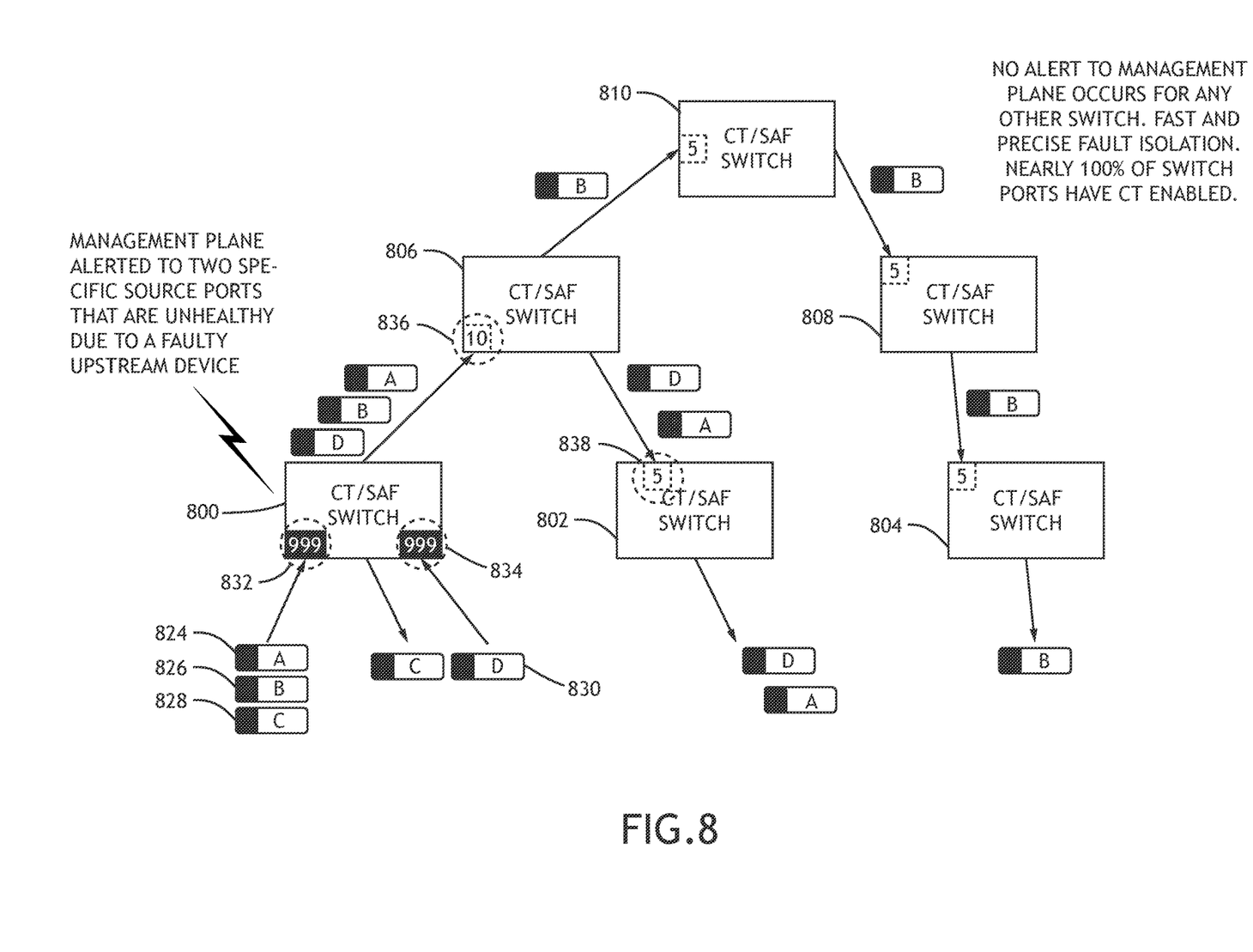
FIG. 8 shows a block representation of data packet propagation through a network of switches according to an exemplary embodiment of the present disclosure.

Referring to FIG. 8, a block representation of data packet propagation through a network of switches 800, 802, 804, 806, 808, 810 according to an exemplary embodiment of the present disclosure is shown. Where the switches 800, 802, 804, 806, 808, 810 are configured for either a CT mode or SAF mode, a first switch 800 may receive faulty data packets 824, 826, 828 from a first port 832 and faulty data packets 830 from a second port 834. While in a default CT mode, the first switch 800 may relay the faulty data packets to other switches 802, 804, 806, 808, 810 in the network, but would also perform data integrity checks on the faulty data packets 824, 826, 828, 830 and utilize the identified faults to build current health metrics for the corresponding ports 832, 834 based on CRC error counters, FEC statistics, and histogram shifts over time. When the current health metric for a port 832, 834 drops below an unhealthy threshold, the first switch 800 switches to an SAF mode to prevent further propagation of faulty packets. In the example shown, while many faulty data packets 824, 826, 828, 830 are received by the ports 832, 834 of the first switch 800, a much more limited number of faulty data packets 824, 826, 828, 830 are propagated to receiving ports 836, 838 in other switches 802, 804, 806, 808, 810 in the network.

In at least one embodiment, where the first switch 800, operating in a CT mode, identifies faulty data packets 824, 826, 828, 830 after they are propagated to other switches 802, 804, 806, 808, 810, the first switch 800 may send one or more subsequent data packets to the other switches 802, 804, 806, 808, 810 indicating that the faulty data packet 824, 826, 828, 830 is known to the first switch 800. Such subsequent data packets may simplify network error diagnosis and inform decisions by those other switches 802, 804, 806, 808, 810 whether to switch to an SAF mode for those ports 836, 838. For example, a downstream switch 802, 804, 806, 808, 810 may also perform the same data integrity checks as the first switch 800 and receive the subsequent data packets indicating that faulty data packets 824, 826, 828, 830 were known to the first switch 800; by comparing the number of self-identified faulty data packets 824, 826, 828, 830 to the number of known faulty data packets 824, 826, 828, 830 indicated by the subsequent data packets, the downstream switch 802, 804, 806, 808, 810 may determine that the link between the downstream switch 802, 804, 806, 808, 810 and the first switch 800 is likely healthy, including any intervening switches 802, 804, 806, 808, 810. By contrast, if the numbers do not match, a faulty link or upstream switch 800, 802, 804, 806, 808, 810 may be identified.

Figure 9:
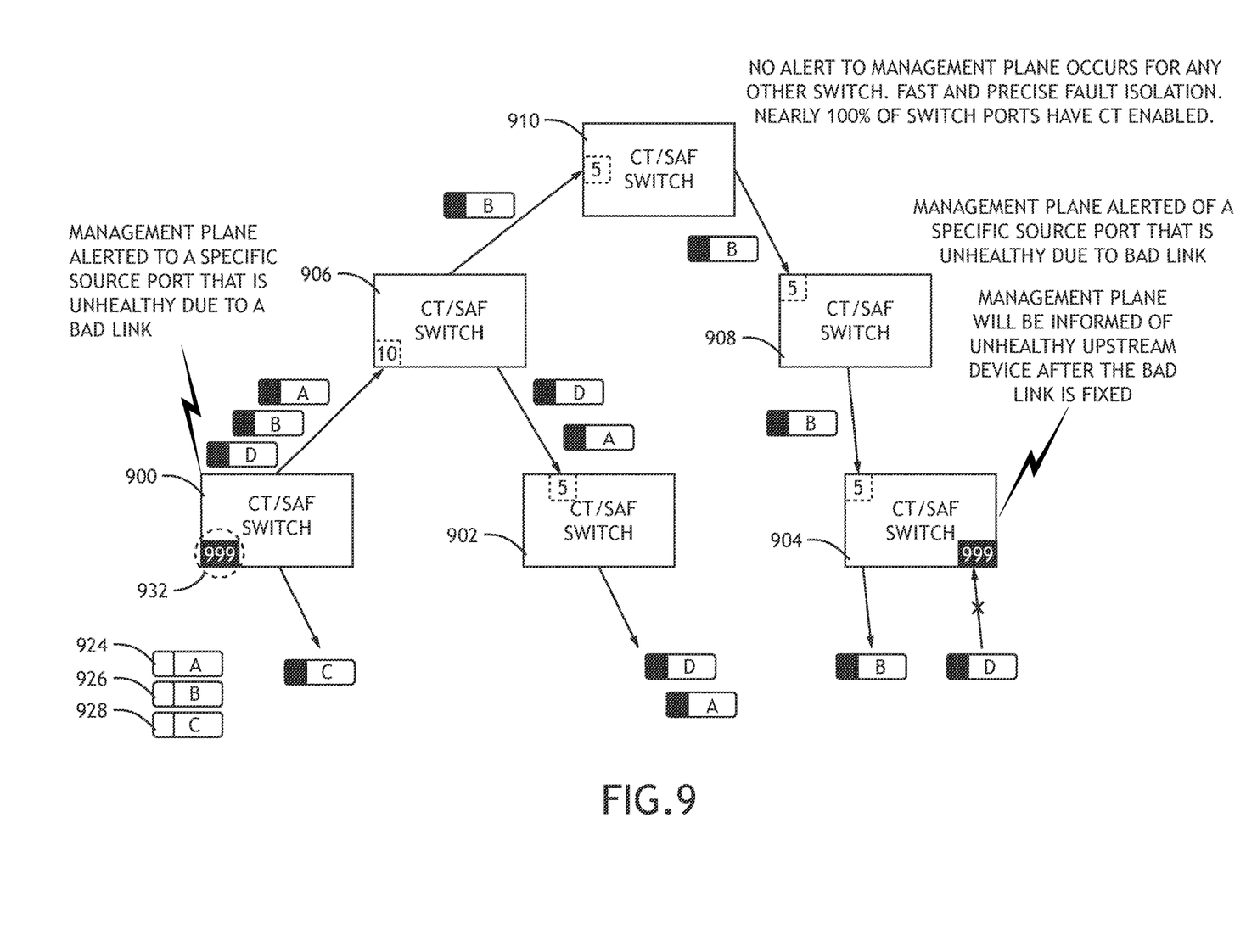
FIG. 9 shows a block representation of data packet propagation through a network of switches according to an exemplary embodiment of the present disclosure.

Referring to FIG. 9, a block representation of data packet propagation through a network of switches 900, 902, 904, 906, 908, 910 according to an exemplary embodiment of the present disclosure is shown. Where the switches 900, 902, 904, 906, 908, 910 are configured for either a CT mode or SAF mode, a first switch 900 may receive otherwise healthy data packets 924, 926, 928 from a first port 932 with a faulty link. Based on current health metrics for the port 932, in addition to switching to an SAF mode, the first switch 900 may identify the faulty link and communicate the error to a management plane monitor. Once the faulty link is corrected, the management plane monitor may communicate the correction to the first switch 900 which may then switch back to the CT mode or continue monitoring for faulty data packets.

Figure 10:
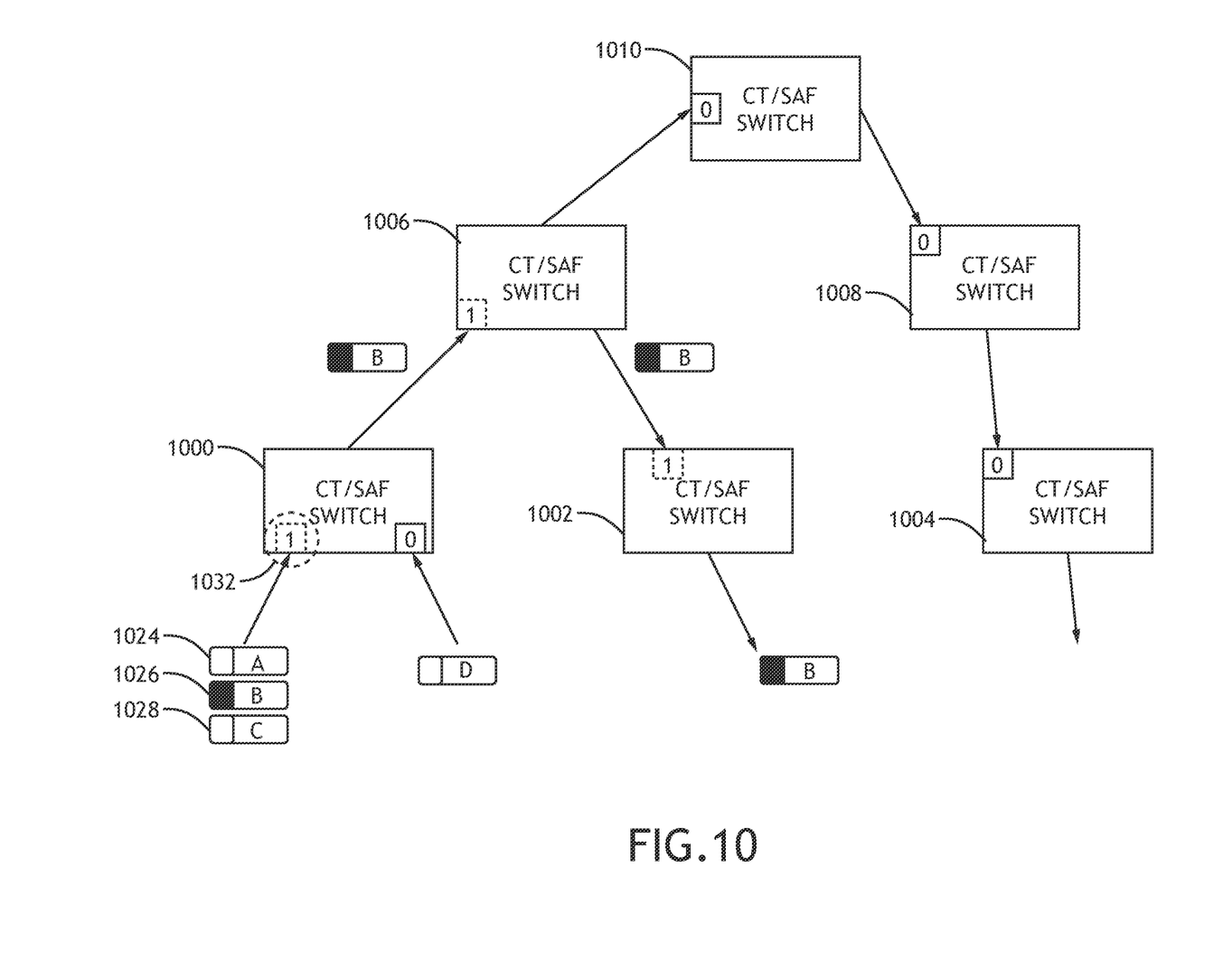
FIG. 10 shows a block representation of data packet propagation through a network of switches according to an exemplary embodiment of the present disclosure.

Referring to FIG. 10, a block representation of data packet propagation through a network of switches 1000, 1002, 1004, 1006, 1008, 1010 according to an exemplary embodiment of the present disclosure is shown. Where the switches 1000, 1002, 1004, 1006, 1008, 1010 are configured for either a CT mode or SAF mode, a first switch 1000 may receive healthy data packets 1024, 1028 and faulty data packets 1026 from a first port 1032. Based on current health metrics for the port 1032, the first switch 1000 may remain in a CT mode such that a small number of faulty data packets 1026 may propagate to downstream switches 1002, 1006. A small background rate of CRC errors does not trigger the SAF mode in any switch 1000, 1002, 1004, 1006, 1008, 1010 or alert a management plane monitor as the small background rate of CRC errors is less troublesome to the network overall than the latency of operating all the switches 1000, 1002, 1004, 1006, 1008, 1010 in an SAF mode.

Embodiments of the present disclosure may identify when a particular source or upstream device is experiencing more than a usual quantity of problems. If a switch detects that the error rate exceeds what would be expected as a baseline, the switch can change to more fault tolerant mode and report the issue to a management plane monitor. Statistical data and recorded health metrics recorded by embodiments of the present disclosure are useful for data centers where the number of human operators is small compared to the number of machines and switches.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
    at least one processor in data communication with a memory storing processor executable code for configuring the at least one processor to:
    receive and relay data packets via a plurality of data ports;
    in a cut-through (CT) mode, begin relaying each data packet from a receive port to a relay port before the entire data packet is received;
    perform one or more data integrity checks on each data packet;
    associate each data integrity check with a receive port;
    change to a store-and-forward (SAF) mode when a port health metric associated with a specific port falls below a defined unhealthy threshold value as measured by data integrity checks associated with the specific port;
    identify a faulty data packet while in the CT mode; and
    report the faulty data packet to a downstream device receiving the faulty data packet using a subsequent data packet, wherein the subsequent data packet indicates the faulty data packet for the downstream device to determine a faulty link based on the subsequent data packet and one or more self-identified faulty data packets la comparing a number of self-identified faulty data packets to a number of faulty data packet indicated by the subsequent data packet.

2. The computer apparatus of claim 1, wherein the at least one processor is further configured to:
    continue to receive and relay data packets via the plurality of data ports while in the SAF mode; and
    change back to the CT mode after a predetermined period of time.

3. The computer apparatus of claim 1, wherein the at least one processor is further configured to:
    continue to receive and relay data packets via the plurality of data ports, and perform the one or more data integrity checks on each data packet, while in the SAF mode; and
    change back to the CT mode when the port health metric associated with the specific port rises above a defined healthy threshold value.

4. The computer apparatus of claim 1, wherein:
    the at least one processor is further configured to maintain a histogram of data integrity check faults for one or more data ports in the plurality of data ports; and
    the port health metric comprises a shift in the histogram over time.

5. The computer apparatus of claim 1, wherein the at least one processor is further configured to operate a first port in the plurality of data ports in a CT mode while simultaneously operating a second port in the plurality of data ports in an SAF mode.

6. The computer apparatus of claim 1, wherein the at least one processor is further configured to report the specific port to a management plane monitor.

7. A network device comprising:
    at least one processor in data communication with a memory storing processor executable code for configuring the at least one processor to:
    receive and relay data packets via a plurality of data ports;
    in a cut-through (CT) mode, begin relaying each data packet from a receive port to a relay port before the entire data packet is received;
    perform one or more data integrity checks on each data packet;
    associate each data integrity check with the receive port;
    change to a store-and-forward (SAF) mode when a port health metric associated with a specific port falls below a defined unhealthy threshold value as measured by data integrity checks associated with the specific port;
    identify a faulty data packet while in the CT mode; and
    report the faulty data packet to a downstream device receiving the faulty data packet using a subsequent data packet, wherein the subsequent data packet indicates the faulty data packet for the downstream device to determine a faulty link based on the subsequent data packet and one or more self-identified faulty data packets by comparing a number of self-identified faulty data packets to a number of faulty data packet indicated by the subsequent data packet.

8. The network device of claim 7, wherein the at least one processor is further configured to:
    continue to receive and relay data packets via the plurality of data ports while in the SAF mode; and
    change back to the CT mode after a predetermined period of time.

9. The network device of claim 7, wherein the at least one processor is further configured to:
    continue to receive and relay data packets via the plurality of data ports, and perform the one or more data integrity checks on each data packet, while in the SAF mode; and
    change back to the CT mode when the port health metric associated with the specific port rises above a defined healthy threshold value.

10. The network device of claim 7, wherein:
    the at least one processor is further configured to maintain a histogram of data integrity check faults for one or more data ports in the plurality of data ports; and
    the port health metric comprises a shift in the histogram over time.

11. The network device of claim 7, wherein the at least one processor is further configured to operate a first port in the plurality of data ports in a CT mode while simultaneously operating a second port in the plurality of data ports in an SAF mode.

12. The network device of claim 7, wherein the at least one processor is further configured to report the specific port to a management plane monitor.

13. A network system comprising:
   at least one network device comprising:
   at least one processor in data communication with a memory storing processor executable code for configuring the at least one processor to:
      receive and relay data packets via a plurality of data ports;
      in a cut-through (CT) mode, begin relaying each data packet from a receive port to a relay port before the entire data packet is received;
      perform one or more data integrity checks on each data packet;
      associate each data integrity check with the receive port;
      change to a store-and-forward (SAF) mode when a port health metric associated with a specific port falls below a defined unhealthy threshold value as measured by data integrity checks associated with the specific port;
      identify a faulty data packet while in the CT mode; and
      report the faulty data packet to a downstream device receiving the faulty data packet using a subsequent data packet, wherein the subsequent data packet indicates the faulty data packet for the downstream device to determine a faulty link based on the subsequent data packet and one or more self-identified faulty data packets by comparing a number of self-identified faulty data packets to a number of faulty data packet indicated by the subsequent data packet.

14. The network system of claim 13, wherein the at least one processor is further configured to:
   continue to receive and relay data packets via the plurality of data ports while in the SAF mode; and
   change back to the CT mode after a predetermined period of time.

15. The network system of claim 13, wherein the at least one processor is further configured to:
   continue to receive and relay data packets via the plurality of data ports, and perform the one or more data integrity checks on each data packet, while in the SAF mode; and
   change back to the CT mode when the port health metric associated with the specific port rises above a defined healthy threshold value.

16. The network system of claim 13, wherein:
   the at least one processor is further configured to maintain a histogram of data integrity check faults for one or more data ports in the plurality of data ports; and
   the port health metric comprises a shift in the histogram over time.

17. The network system of claim 13, wherein the at least one processor is further configured to operate a first port in the plurality of data ports in a CT mode while simultaneously operating a second port in the plurality of data ports in an SAF mode.

* * * * *